(12) United States Patent
Li et al.

(10) Patent No.: US 12,380,179 B2
(45) Date of Patent: Aug. 5, 2025

(54) HTTP/3 AND QUIC-BASED DEVICE AND APPLICATION CHARACTERIZATION

(71) Applicant: Verizon Patent and Licensing Inc., Basking Ridge, NJ (US)

(72) Inventors: Feng Li, Lexington, MA (US); Haim S. Ner, Fair Lawn, NJ (US); Bjorn Olof Erland Kalderen, South Orange, NJ (US); Ning Chen, Harvard, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 931 days.

(21) Appl. No.: 17/470,176

(22) Filed: Sep. 9, 2021

(65) Prior Publication Data
US 2023/0074934 A1 Mar. 9, 2023

(51) Int. Cl.
| | | |
|---|---|---|
| H04W 12/06 | (2021.01) | |
| G06F 18/2413 | (2023.01) | |
| H04L 67/02 | (2022.01) | |
| H04L 69/22 | (2022.01) | |
| H04W 72/04 | (2023.01) | |
| H04W 80/12 | (2009.01) | |

(52) U.S. Cl.
CPC ........ *G06F 18/24147* (2023.01); *H04L 69/22* (2013.01); *H04W 12/06* (2013.01); *H04W 72/04* (2013.01); *H04L 67/02* (2013.01); *H04W 80/12* (2013.01)

(58) Field of Classification Search
CPC .......... G06F 18/2413; G06F 18/24147; H04L 69/22; H04L 67/02; H04L 67/141; H04L 9/40; H04L 69/164; H04W 12/06; H04W 72/04; H04W 80/12; H04W 12/03; H04W 12/10; H04W 8/02; H04W 80/04
See application file for complete search history.

(56) References Cited

U.S. PATENT DOCUMENTS

| | | | |
|---|---|---|---|
| 8,516,586 B1* | 8/2013 | Jensen | H04L 63/1425 |
| | | | 713/153 |
| 9,565,258 B1* | 2/2017 | Roskind | H04L 67/14 |
| 10,193,934 B2* | 1/2019 | Skuratovich | H04L 65/762 |
| 10,362,069 B2* | 7/2019 | Skuratovich | H04L 69/165 |
| 10,810,279 B2* | 10/2020 | Goel | H04L 67/02 |
| 11,329,806 B1* | 5/2022 | Akkaya | H04L 9/0844 |
| 2018/0048567 A1* | 2/2018 | Ignatchenko | H04L 47/56 |
| 2018/0131593 A1* | 5/2018 | Jain | H04L 43/18 |
| 2018/0139131 A1* | 5/2018 | Ignatchenko | H04L 47/32 |
| 2019/0052713 A1* | 2/2019 | Zlatokrilov | H04L 47/2483 |
| 2019/0068503 A1* | 2/2019 | Wei | H04L 47/11 |
| 2019/0081983 A1* | 3/2019 | Teal | G06F 21/602 |
| 2019/0116123 A1* | 4/2019 | Shiell | H04L 69/161 |
| 2019/0207778 A1* | 7/2019 | Qiao | H04W 76/10 |

(Continued)

*Primary Examiner* — Hassan A Phillips
*Assistant Examiner* — Prenell P Jones

(57) ABSTRACT

A system may include a first network device. The first network device may include a first processor configured to: obtain a copy of a first message sent from an application on a User Equipment device (UE); construct a signature based on the copy of the first message; and send a second message including the signature to a second network device. The second message may request the second network device to either train a classification model or to provide a device type of the UE or an application type of the application to the first network device.

20 Claims, 8 Drawing Sheets

(56) References Cited

U.S. PATENT DOCUMENTS

| | | | |
|---|---|---|---|
| 2019/0268305 A1* | 8/2019 | Xu | H04L 61/5007 |
| 2019/0303562 A1* | 10/2019 | Masputra | H04L 69/164 |
| 2019/0319456 A1* | 10/2019 | Brathwaite | H02J 4/00 |
| 2020/0128083 A1* | 4/2020 | Fieau | H04L 67/567 |
| 2020/0145324 A1* | 5/2020 | Wei | H04L 61/5007 |
| 2020/0274815 A1* | 8/2020 | Sreevalsan | G06N 20/00 |
| 2021/0120403 A1* | 4/2021 | Fajri | H04L 61/503 |
| 2021/0345162 A1* | 11/2021 | Sarker | H04L 67/535 |
| 2021/0377217 A1* | 12/2021 | Antoche Albisor | G06F 21/577 |
| 2022/0114594 A1* | 4/2022 | Nunes | G06Q 20/4016 |
| 2022/0174044 A1* | 6/2022 | Konda | H04L 63/0442 |
| 2022/0329508 A1* | 10/2022 | Joch | H04L 43/0882 |
| 2022/0385550 A1* | 12/2022 | Villasante | H04L 47/2441 |
| 2023/0012504 A1* | 1/2023 | Kornev | H04L 63/0245 |
| 2023/0074934 A1* | 3/2023 | Li | H04W 8/02 |
| 2023/0370423 A1* | 11/2023 | Muñoz de la Torre Alonso | H04L 61/4511 |
| 2023/0394476 A1* | 12/2023 | Pagani | G06Q 20/3829 |
| 2023/0412893 A1* | 12/2023 | Hering | H04N 21/64723 |
| 2024/0121329 A1* | 4/2024 | Mih?ly | H04L 69/326 |

* cited by examiner

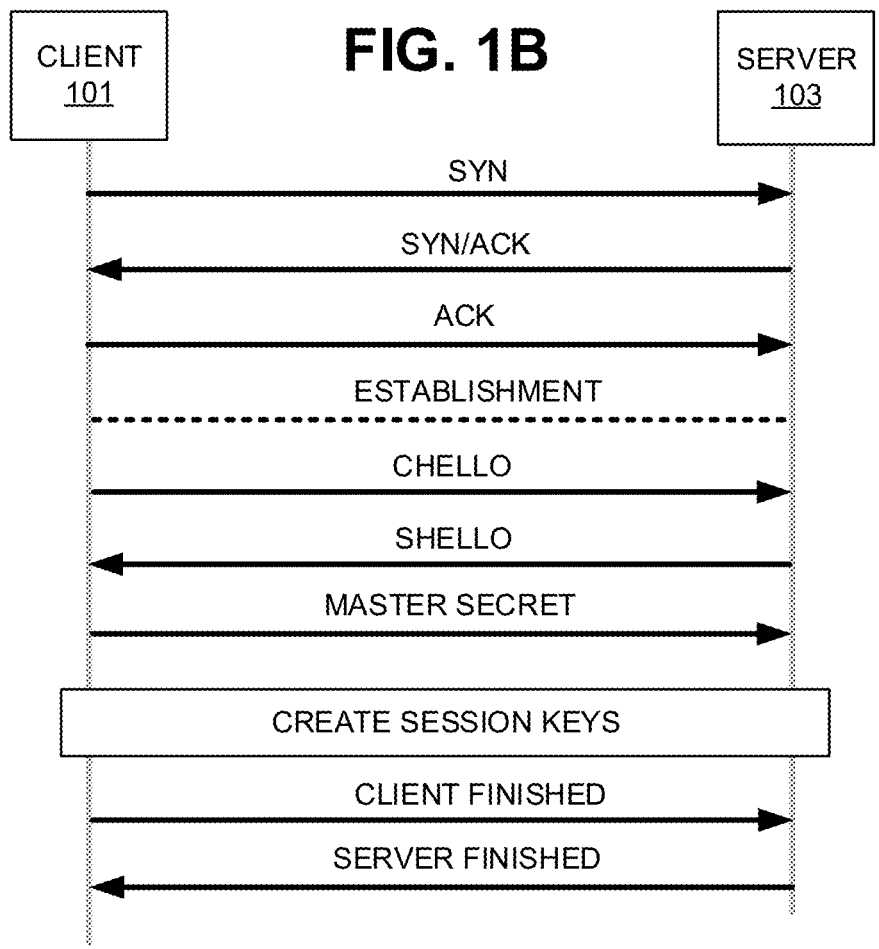
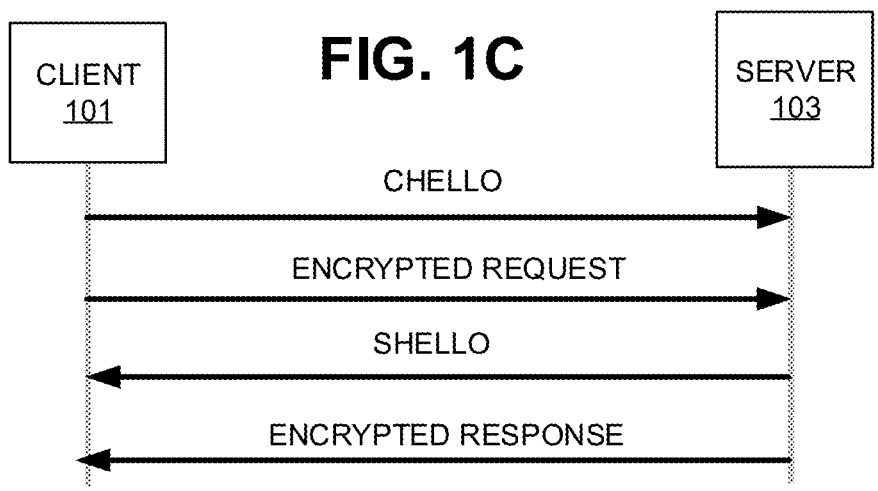

| HEADER BYTE 402 | VERSION 404 |
|---|---|
| DCID LENGTH 406 | DCID 408 |
| SCID LENGTH 410 | SCID 412 |
| TOKEN LENGTH 414 | TOKEN 416 |
| PACKET NUMBER 418 | PAYLOAD 420 |

| INDEX 502 | VALUE 504 |
|---|---|
| 1 | 0xff00001d |
| 2 | TR.SLAPCLAP.COM |
| 3 | *SM-G986U |
| 4 | 0x01e8816092921ae8 |
| 10 | AESG (0x41455347) |
| 11 | C255 (0x43323535) |

US 12,380,179 B2

HTTP/3 AND QUIC-BASED DEVICE AND APPLICATION CHARACTERIZATION

BACKGROUND INFORMATION

Open Systems Interconnection (OSI) model was developed to support diverse computer networks. The model depicts a network as having seven layers. The layers include: the application layer, the presentation layer, the session layer, the transport layer, the network layer, the data link layer, and the physical layer. The Internet Protocol (IP) suite corresponds to the network layer, which is sometimes referred to as the IP layer.

A device in an IP network can send or receive packets over the IP layer and lower layers using either connections (or sessions) or without using connections. An example of a connection-based protocol is a Transmission Control Protocol (TCP)/IP. For a session, TCP/IP requires setting up two endpoints. During the session, each of the endpoints may send a stream of packets to the other endpoint. Examples of TCP/IP include the file-transfer protocol (FTP) and telnet.

An example of a connectionless protocol includes User Datagram Protocol (UDP). In contrast to TCP/IP, UDP does not include many of the TCP/IP mechanisms for ensuring reliable delivery of packets and is simpler. UDP packets are lightweight, and UDP communications may exhibit less latency than TCP/IP communications.

BRIEF DESCRIPTION OF THE DRAWINGS

FIG. 1B shows an example exchange of messages between a client and a server to establish a secure connection between the client and the server based on a Transport Layer Security (TLS) protocol;

FIG. 1C shows an example exchange of messages between a client and a server to establish a secure connection between the client and the server based on a QUIC/TLS protocol;

FIG. 4 is a diagram of an example format of a QUIC CHELLO message according to an implementation;

FIG. 5 is an example table of data obtained from an example QUIC CHELLO message according to an implementation.

DETAILED DESCRIPTION OF EXAMPLE EMBODIMENTS

The following detailed description refers to the accompanying drawings. The same reference numbers in different drawings may identify the same or similar elements.

Figure 1A:
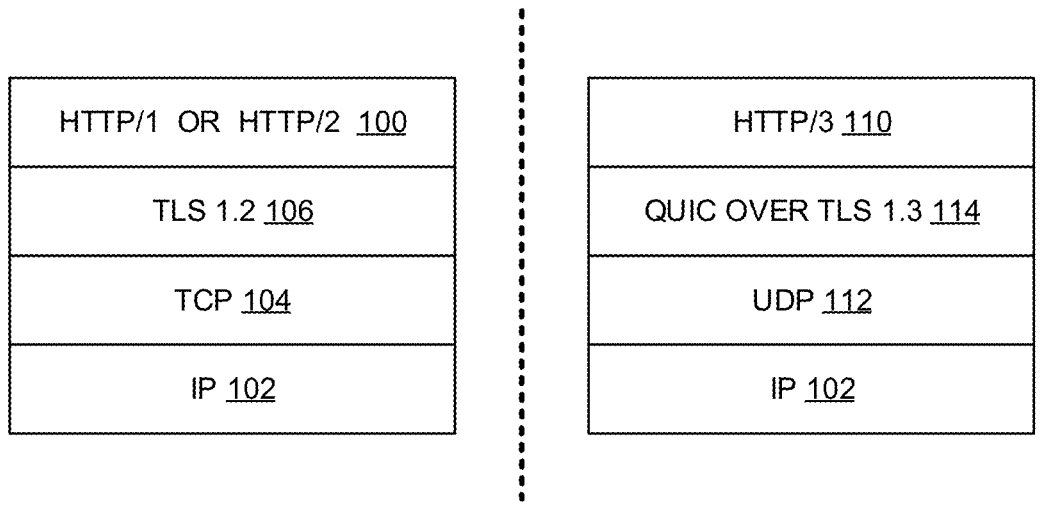
FIG. 1A illustrates a Hypertext Transfer Protocol version 1 or version 2 (HTTP/1 or HTTP/2) layers and HTTP/3 layers.

Systems and methods described herein relate to obtaining application or device related information from messages (e.g., packets) that are sent from a client to a server. More specifically, the systems and methods relate to obtaining device signatures and/or application signatures (e.g., information that characterize or identify the device or the application) from the messages sent over Hypertext Transfer Protocol version 3 (HTTP/3 or HTTP3) and QUIC protocol. A browser or a browser-like client application, which are referred to herein as a browser or client, may interact with a web server or a web server-like program, herein referred to as server, over different versions of HTTP. FIG. 1A illustrates HTTP version 1 and version 2 (HTTP/1 and HTTP/2) network layers 100 (also referred to as stack 100). As shown, HTTP/1 and HTTP/2 stack 100 includes an Internet Protocol (IP) layer 102, a Transmission Control Protocol (TCP) layer 104, and a Transport Layer Security (TLS) version 1.2 layer 106. That is HTTP/1 and HTTP/2 stack 100 is constructed on top of IP layer 102, TCP layer 104, and TLS 1.2 layer 106. Other network layers (e.g., the physical layer) are not shown in FIG. 1A.

IP layer 102 (in conjunction with the lower layers) carries IP packets. IP layer 102 may use either IP version 4 (IPv4) or IP version 6 (IPv6). TCP layer 104 comprises the mechanisms for session-based communications between the two endpoints. Because TCP layer 104 provides for reliable communications (e.g., a mechanism for retransmitting a packet when the packet is not received), TCP layer 104 necessarily bears the overhead associated with this reliability. TLS 1.2 layer 106 handles network security and privacy. To render a channel secure and private, TLS 1.2 requires the endpoints to share security keys, encrypt messages, and decrypt the messages at the endpoints. Setting up a secure connection over TCP layer 104 and TLS 1.2 layer 106 requires exchanging multiple handshake messages that add to the overhead.

FIG. 1A also illustrates HTTP/3 network layers 110 (also referred to as stack 110). As shown, HTTP/3 stack 110 is constructed based on IP layer 102, a User Datagram Protocol (UDP) layer 112, and a QUIC layer 114. As discussed above, UDP layer 112 provides the mechanisms for non-session based communications between the endpoints. Because the UDP is simple, UDP can be more efficient than TCP for certain communications. QUIC layer 114 takes advantage of UDP layer 112 to implement an efficient and secure transport layer for communications between the two endpoints using TLS 1.3.

HTTP/3 addresses a number of performance problems that are associated with HTTP/1 and HTTP/2. For example, HTTP/3 addresses the head-of-line problem in HTTP/2. In HTTP/2, a session may include multiple streams between the two endpoints. If a faulty packet in a particular stream is detected, however, all other streams must wait until the correction is made in the particular stream. This is because the HTTP/2 relies on TCP layer 104, which requires orderly transmission and receipt of all data packets of the session. In contrast, a HTTP/3 permits a session to include multiple independent streams. Whether a particular stream fails to convey packets, the other streams may nonetheless continue to carry data packets between the endpoints.

Further, HTTP/3 requires fewer handshake messages to establish a connection than HTTP/2. FIG. 1B shows an example exchange of messages between a client 101 (also referred to as application 101) and a server 103 to establish a secure connection between client 101 and server 103 over HTTP/2. In FIG. 1B, TLS 1.2 for HTTP/2 requires client 101 and server 103 exchange at least 8 messages to establish a session. FIG. 1C shows an example exchange of messages between client 101 and server 103 to establish a secure connection between client 101 and server 103 over HTTP/3. In FIG. 1C, QUIC and TLS 1.3 for HTTP/3 require client 101 and server 103 exchange 4 messages to establish a session. Contrasting FIG. 1B and FIG. 1C, it is clear that there is less overhead associated with HPPT/3 than with HTTP/2 to establish a secure session.

Given many improvements over HTTP/2, the HTTP/3 is becoming an increasingly popular transport protocol option. In the future, HTTP/3 is expected to become the dominant transport protocol. Because end-to-end encryption is required in HTTP/3, however, by adopting HTTP/3, Internet Service Providers (ISPs) and network management groups may face a number of challenges. For example, ISPs may lose part of their legacy manageability of their own networks. QUIC avoids middle-man attacks through its encryption scheme. One consequence of this security feature is that the ISPs may not be able to easily differentiate application flows on their own networks.

By adopting HTTP/3, the ISPs and network management groups nay also lose their ability to distinguish tethering devices. Maintaining a single HTTP/3 session may entail multiplexing data streams from multiple applications to a single data stream. This renders detecting tethering devices more difficult for the ISPs. This may lead to revenue leaks and/or unauthorized usage of the networks.

Therefore, there is a need to develop HTTP/3 based systems and methods for differentiating client applications and devices to restore (at least partially) network management functions. The systems and methods described herein relate to obtaining application-specific and/or device-specific signatures from the data sent over HTTP/3 for differentiating applications and device types.

Figure 2A:
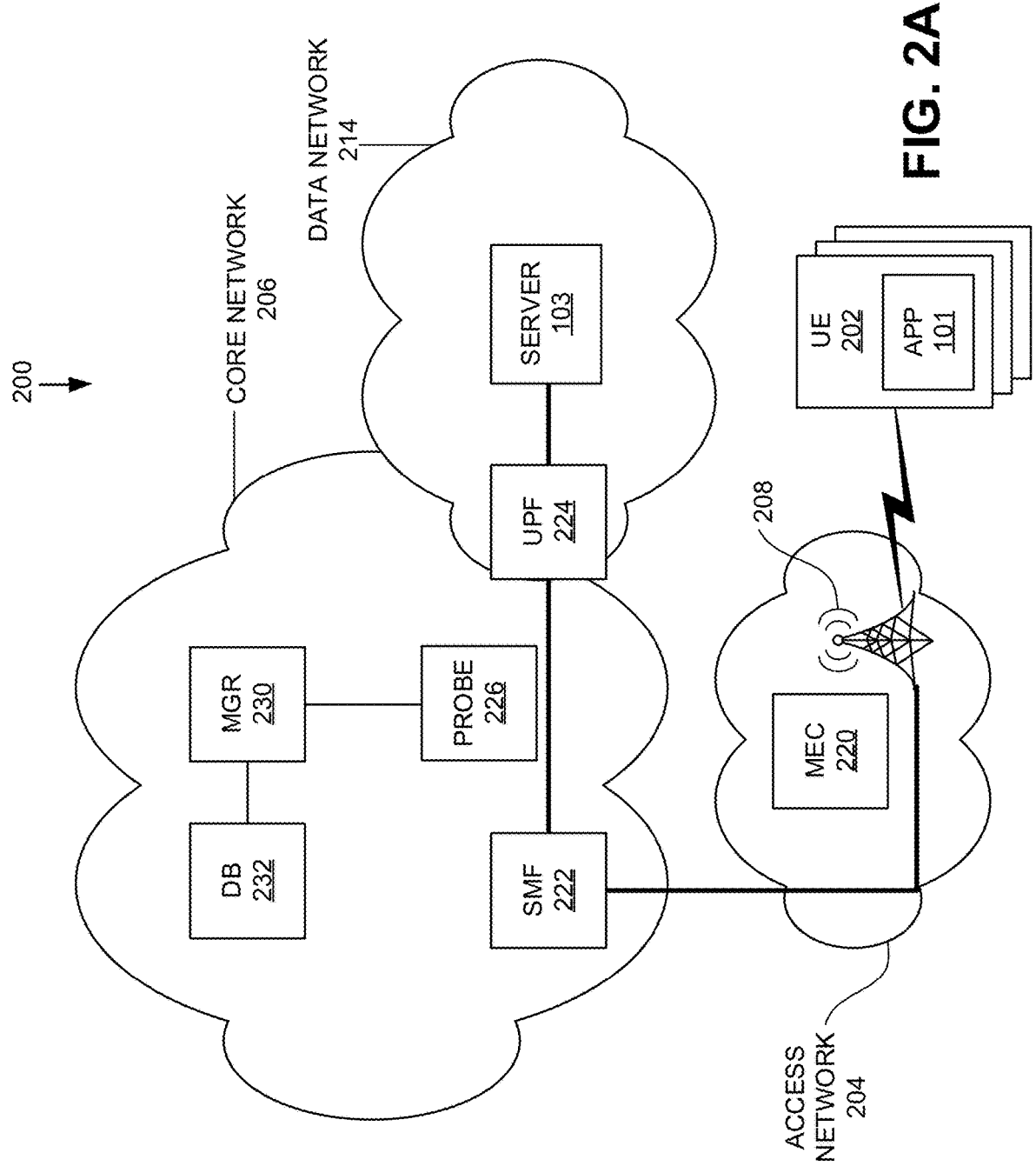
FIG. 2A depicts an example network environment in which a system described herein may be implemented.

FIG. 2A illustrates an example network environment 200 in which the systems and methods described herein may be implemented. As shown, environment 200 may include User Equipment (UE) devices 202 (individually and generically referred to as UE 202), an access network 204, a core network 206, and a data network 214. UE 202 may include a wireless communication device, a mobile terminal, or a fixed wireless access (FWA) device. Examples of UE 202 include: a smart phone; a tablet device; a wearable computer device (e.g., a smart watch); a laptop computer; an autonomous vehicle with communication capabilities; a portable gaming system; and an Internet-of-Thing (IoT) device.

In some implementations, UE 202 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE 202 may send packets to or over access network 204. UE 202 may have the capability to select a particular network slice from which UE 202 can request a service. UE 202 may have the capability to connect to different radio access technology (RAT) access devices, such as LTE or 5G base stations. UEs 202 may each include instances of application 101, which is described below with reference to FIG. 2B.

Access network 204 may include an LTE radio network, a 5G radio network and/or another advanced radio network. These radio networks may operate in many different frequency ranges, including millimeter wave (mmWave) frequencies, sub 6 GHz frequencies, and/or other frequencies. Access network 204 may include many wireless stations, Central Units (CUs), Distributed Units (DUs), and Integrated Access and Backhaul (IAB) nodes. In FIG. 2A, only one wireless station 208 is shown. Wireless station 208 may establish and maintain an over-the-air channel with UEs 202 and backhaul channels with core network 206.

Wireless station 208 may include an LTE, 5G, or another type of wireless station (e.g., evolved Node B (eNB), next generation Node B (gNB), etc.) that includes one or more Radio Frequency (RF) transceivers.

As further shown, access network 204 may include a Multi-Access Edge Computing (MEC) network 220 (also referred to as "MEC cluster 220" or simply as "MEC 220"). MEC 220 may be located geographically close to wireless stations 208 or an IAB node, and therefore also close to UEs 202 serviced by wireless station 208 or IAB nodes. Due to its proximity to UEs 202, MEC 220 may be capable of providing services to UEs 202 with minimal latency. Depending on the implementation, MEC 220 may provide many core network functions at network edges. In other implementations, MEC 220 may be positioned at other locations (e.g., in core network 206) at which MEC 220 can provide computational resources for improved performance. Although not illustrated, MEC 220 may include various network components that are part of core network 206 and/or data network 214 and part of the system for obtaining device-specific and/or application-specific signatures from the data sent over HTTP/3.

Core network 206 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, a Public Land Mobile Network (PLMN), or a combination of networks. Core network 206 may allow the delivery of IP services to UE 202 and may interface with other networks, such as data network 214.

Depending on the implementation, core network 206 may include 4G core network components (e.g., a Serving Gateway (SGW), a Packet data network Gateway (PGW), a Mobility Management Entity (MME), etc.), 5G core network components (e.g., a User Plane Function (UPF), an Application Function (AF), an Access and Mobility Function (AMF), a Session Management Function (SMF), a Unified Data Management (UDM) function, a Network Slice Selection Function (NSSF), a Policy Control Function (PCF), etc.), or another type of core network components. Such core network components may be part of the system for obtaining device-specific and/or application-specific signatures from data flows.

Data network 214 may include networks that are external to core network 206. In some implementations, data network 214 may include packet data networks, such as an Internet Protocol (IP) network. As shown, data network 214 may include server 103, which is described below with reference to FIG. 2B.

In FIG. 2A, UE 202 is depicted as including application 101; core network 206 is shown as comprising an SMF 222, a UPF 224, a signature probe 226, a signature manager 230, and a signature database (DB) 232; and data network 214 is shown as comprising server 103. Application 101, SMF 222, UPF 224, signature probe 226, signature manager 230, signature DB 232, and server 103 are part of the system for obtaining device-specific and/or application-specific signatures from packets sent from application 101 in UE 202 over HTTP/3. For clarity, these components and other components of the system are shown again in FIG. 2B without other elements of network environment 200 and are further described below with reference to FIG. 2B.

FIG. 2A does not show all components that may be included in network environment 200 (e.g., routers, bridges, wireless access points, additional networks, additional UEs 202, wireless station 208, MEC 220, etc.). Depending on the implementation, network environment 200 may include additional, fewer, different, or a different arrangement of components than those illustrated in FIG. 2A. Furthermore, in different implementations, the configuration of network environment 200 may be different. For example, wireless station 208 may not be linked to IAB nodes and may operate in frequency ranges (e.g., sub-6 GHz) different from or same as those used by the IAB nodes (e.g., mmWave or another frequency range).

Figure 2B:
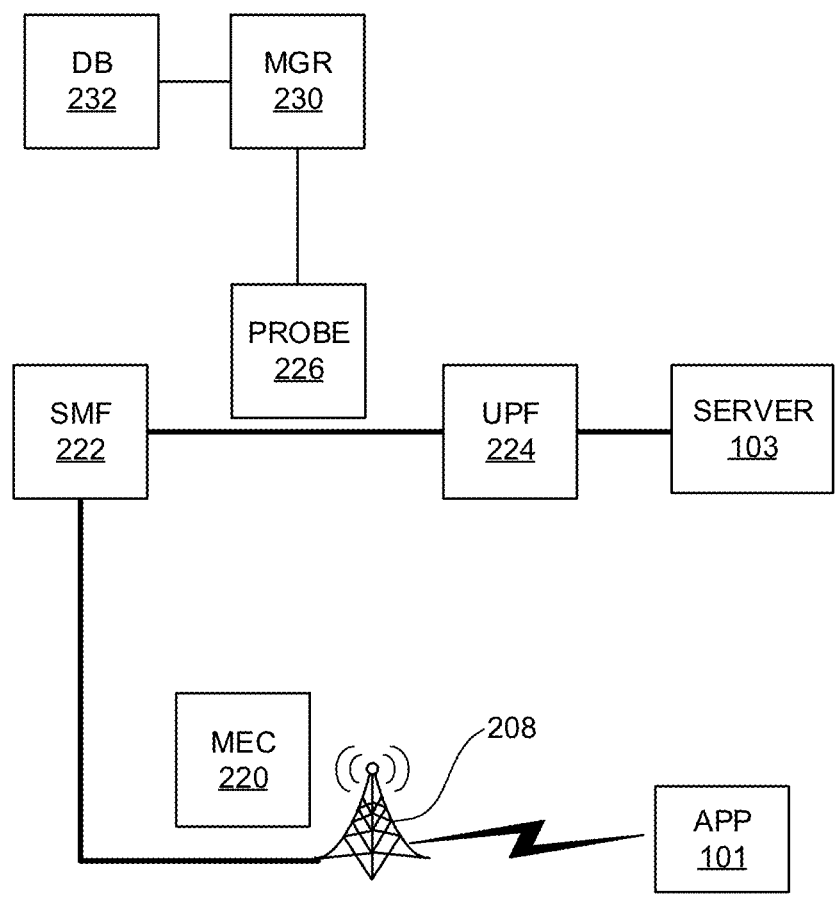
FIG. 2B depicts an example components of the system, according to an implementation.

FIG. 2B depicts example components of a system 250 for obtaining application-specific and device-specific signatures according to an implementation. In other embodiments, system 250 may include additional, fewer, different, or a different arrangement of components than those illustrated in FIG. 2B. In the embodiment shown, system 250 includes application 101, server 103, wireless station 208, MEC 220, an SMF 222, a UPF 224, signature probe 226, signature manager 230, and signature DB 232. Wireless station 208 and MEC 220 have been described above with reference to FIG. 2A.

Application 101 may include a browser or a browser-like application or any other application that implements HTTP/3 for communicating with server 103. To establish a secure session with server 103, application 101 may send a series of packets over HTTP/3. Once a secure session is established, application 101 may exchange data with server 103 over the session.

Server 103 may include an application server, a web server, or another server that renders services to application 101 over HTTP/3. Server 103 may receive a request to establish a secure session from application 101, grant the request, and use keys exchanged between application 101 and server 103 to conduct the session.

SMF 222 may include a 5G core component. Depending on the implementation, SMF 222 may perform functions in addition to those for standard 5G SMF, as part of system 250. As part of system 250, SMF 222 may provide device-specific and/or application-specific signature information from data flows that SMF 222 manages to signature probe 226. In some implementations, SMF 222 may act as a host to signature probe 226, permitting signature probe 226 to obtain signature information from the data flows.

As part of core network 206, SMF 222 may perform session establishment, modification, and/or release, perform IP address allocation and management, perform Dynamic Host Configuration Protocol (DHCP) functions, perform selection and control of UPF 224, configure traffic steering at UPF 224 to guide traffic to the correct destination, terminate interfaces toward a PCF, perform lawful intercepts, charge data collection, support charging interfaces, terminate session management of Non-Access Stratum (NAS) messages, perform downlink data notification, manage roaming functionality, and/or perform other types of control plane functions for managing user plane data.

UPF 224 may include a 5G core component. Depending on the implementation, UPF 224 may perform functions in addition to those for a standard 5G UPF, as part of system 250. As part of system 250, UPF 224 may provide device-specific and/or application-specific signature information from data flows for which UPF 224 acts as session anchors to signature probe 226. In some implementations, UPF 224 may act as a host to signature probe 226, permitting signature probe 226 to obtain signature information from the data flows.

As part of core network 206, UPF 224 may maintain an anchor point for intra/inter-RAT mobility, maintain an external protocol data unit (PDU) point of interconnect to a data network (e.g., data network 214), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, send and forward an "end marker" to a radio access network node (e.g., gNB), and/or perform other types of user plane processes.

Signature probe 226 may include a component running on one or more network elements on a data plane. For example, signature probe 226 may be hosted on a device that implements SMF 222, UPF 224, or another network component (e.g., routers, proxy boxes, middle boxes, eNB, gNB, SGW, and PGW).

Signature probe 226 may generate signatures using a particular type of QUIC messages sent from application 101 to server 103. The type of QUIC messages that signature probe 226 obtains form the flows is herein referred to as a Client Hello (CHELLO or CHLO) message. CHELLO messages are sent from application 101 to server 103 during the establishment of the session. FIG. 1C shows an example CHELLO message. Although application 101 and server 103 may exchange other types of QUIC messages, such messages are encrypted under TLS 1.3, and signature probe 226 ignores them—these QUIC messages are unusable for extracting device-specific and/or application-specific signatures therefrom.

To generate a signature from a QUIC CHELLO message, signature probe 226 may extract pieces of information from unencrypted fields of the header of the QUIC CHELLO message. Signature probe 226 may string the extracted pieces of information, herein referred to as vector components, together to generate a signature. In addition to the vector components, the signature may include data/information that indicates, for example, whether the signature is a training signature—a signature to be used by signature manager 230 for training a classification model.

After generating a signature, signature probe 226 may create a signature message (e.g., a message that includes the signature) and send the signature message to signature manager 230, which may then respond with a reply that includes information identifying the type of UE 202 or application 101 that sent the CHELLO message to server 103. Based on the response, signature probe 226 may mark the flow corresponding to the CHELLO message (e.g., indicate within a table or a DB that has flow information, or alternatively, in a separate DB or table, the type of UE 202 and/or application 101 associated with the flow). If the response from signature manager 230 does not indicate either the device type or application type, signature probe 226 may leave the flow unmarked.

Signature manager 230 may provide a service for identifying a device type or an application type ("fingerprinting service") to signature probe 226 or another network component. In some implementations, signature manager 230 may be combined with signature probe 226 as a single component. In other implementations, signature manager 230 may be implemented as a component separate from signature probe 226 but on the same network device on which signature probe 226 is installed to minimize network latency associated with the fingerprinting service. In another implementation, signature manager 230 may be implemented on a network device different from the devices on which signature probes 226 run. In such an implementation, signature manager 230 may offer a centralized fingerprinting service to signature probes 226.

When signature manager 230 receives a request from signature probe 226 to identify a device type and/or an application type based on a signature provided by signature probe 226 in the request, signature manager 230 may compare the signature to patterns that are stored in signature DB 232. When comparing the signature to the patterns, signature manager 230 may apply a particular algorithm.

In one implementation, signature manager 230 may apply an algorithm that involves computing an Euler distance between a signature and each of patterns stored in signature DB 232. Assume that a signature f can be expressed in the form:

$$F(f_1, f_2, \ldots f_n) \quad (1)$$

In expression (1), F is an n-dimensional vector. Each of vector components $f_1, f_2 \ldots f_n$ represents a parameter (e.g., a number, a character string, a symbol, etc.).

Assume that each pattern $P_i$ that is stored in signature DB 230 can be expressed as:

$$P_i(p_1, p_2 \ldots p_n) \quad (2)$$

$P_i$ is a vector, where i=1 to N (i.e., a whole number). In expression (2), each of vector components $p_1, p_2 \ldots p_n$ represents a parameter (e.g., a number, a character string, a symbol, etc.). Given expressions (1) and (2), the Euler distance $d_i$ between F and $P_i$ can be computed as:

$$d_i = [(f_1 - p_1)^2 + (f_2 - p_2)^2 + \ldots (f_n - p_n)^2]^{1/2} \quad (3)$$

Signature manager 230 may apply, given signature F, expression (3) for each of the patterns $P_i$'s in signature DB 232. After determining the $d_i$'s for i=0 . . . N, signature manager 230 may select the smallest $d_i$, herein referred to as $d_M$ (with i=M) and the pattern for which the smallest distance is computed. Signature manager 230 may obtain, from signature DB 232, device type and/or application type associated with the selected pattern. That is, signature manager 230 may determine that UE 202 and/or application 101 which sent the CHELLO message is of the device type and/or the application type associated with $M^{th}$ pattern $P_M$.

In one implementation, signature manager 230 may implement optimizations for using expression (3) when applying its algorithm for matching a signature sent from signature probe 226 to patterns in signature DB 232. For example, assume that while computing expression (3), signature manager 230 determines that a distance between a signature F and a pattern $P_i$ is zero for i=R (R is a whole number). At this point in the algorithm, rather than continuing to calculate distances for R+1, R+2 . . . N patterns, signature manager 230 may conclude that $P_R$ is the matching pattern and terminate its distance calculations for the signature.

When signature manager 230 applies expression (3) (or another expression), signature manager 230 uses patterns $P_i$'s. Signature manager 230 may generate these patterns in advance, using various algorithms.

Depending on the implementation and its configuration, signature manager 230 may apply different machine learning (ML) algorithms to training data to generate the patterns that may be used to determine the device type and/or the application type for a particular signature. The training data may be collected through a well-controlled lab environment. The collected data may include CHELLO messages from applications running on UEs 202 from different vendors. After building initial training datasets, the ML algorithms are applied to QUIC messages collected from less controlled environments (e.g., production networks) to enhance signatures (e.g., supervised self-learning techniques). The algorithms may include, for example, a K-Means clustering algorithm, a Nearest Neighbor algorithm (e.g., K-Nearest Neighbor algorithm, weighted Euler distance based Nearest Neighbor algorithm, etc.). After generating the patterns and storing the generated patterns in signature DB 232 along with information identifying device type and/or application type for each of the patterns.

When signature probe 226 sends a request to identify a device type and/or application type to signature manager 230 and signature manager 230 is able to find the pattern that matches a given signature, signature manager 230 may send a reply to signature probe 226. The reply may indicate the device type and/or the application type associated with the pattern. If signature manager 230 is unable to find a matching pattern, signature manager 230 may add the signature to the store of unmatched signatures in signature DB 232. The unmatched signatures may later be used for offline analysis, for example.

Signature DB 232 may store signatures and patterns that have been generated by signature manager 230. Each of the stored signatures may or may not have been matched to a pattern by signature manager 230. Signatures that have been matched to a pattern may be deemed classified (e.g., identified as belonging to a particular application or a device) and those that have not been matched to a pattern may be deemed unclassified. A signature stored at signature DB 232 may not have been classified, for example, because signature manager 230 has not been able to identify a pattern that is definitively closer to the signature than other patterns (e.g., based on Euler distances). In addition to the patterns and signatures, signature DB 232 may also store, for each of the patterns, information identifying a corresponding device type and/or application type.

Figure 3:
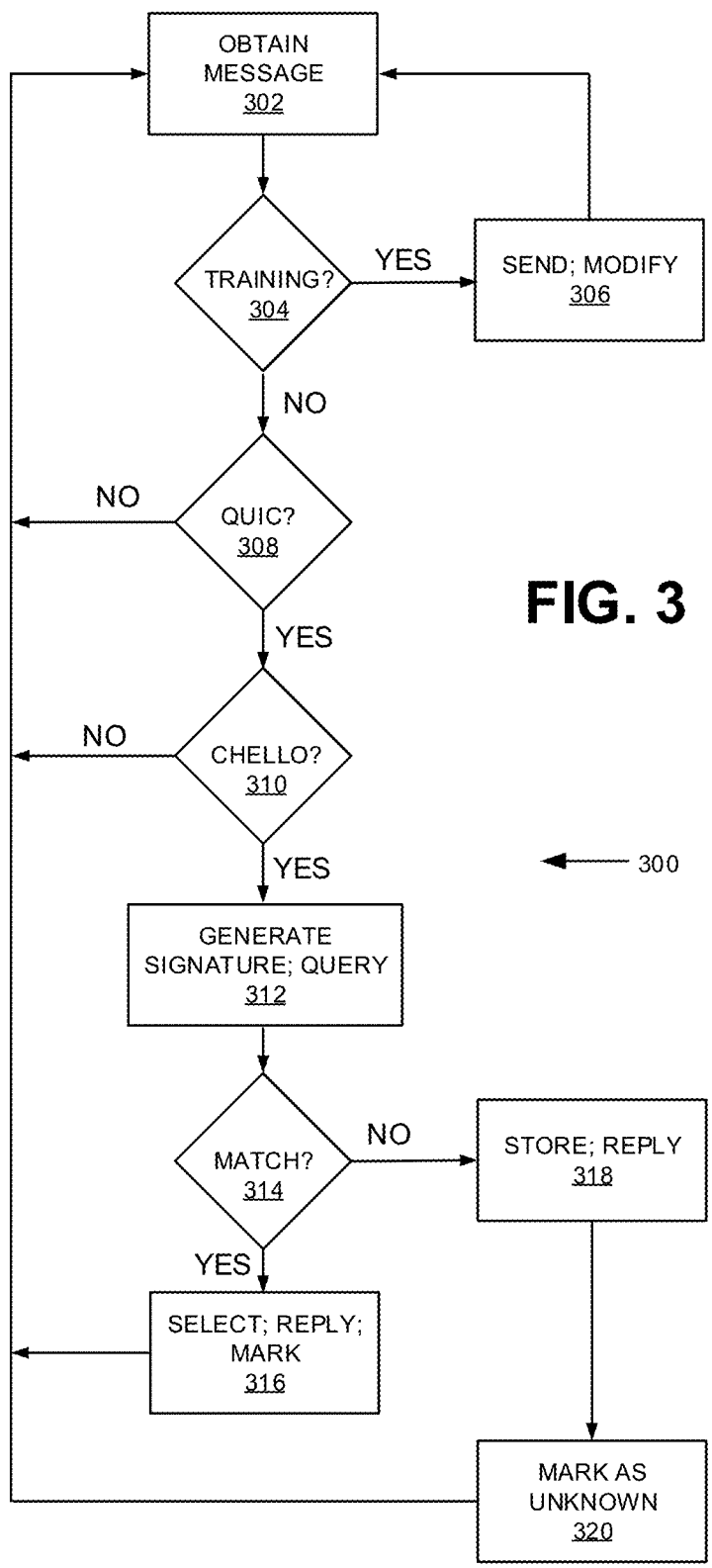
FIG. 3 is a flow diagram of an example process that is associated with obtaining a signature from a QUIC client hello (CHELLO) message.

FIG. 3 is a flow diagram of an example process 300 that is associated with obtaining device type and/or application type information from HTTP/3 packets. In one embodiment, signature probe 226 and signature manager 230 may perform process 300 in combination with other network components. Depending on the implementation, process 300 may be performed by hard-wired logic (e.g., devices that include an Application Specific Integrated Circuit (ASIC), a Field Programmable Gate Array (FPGA), programmable logic device, chipset, application specific instruction-set processor (ASIP), etc.) or by one or more processors executing software (e.g., script, program, executables or binaries, interpreted code, bytecode, etc.).

As shown, process 300 may include signature probe 226 obtaining a message (block 302). For example, signature probe 226 that is installed on UPF 224 may obtain a copy of a message, from UPF 224, which is sent from application 101 to server 103. In other implementations, signature probe 226 may obtain the message from another device, such as an MME, a PGW, a router, a switch, SMF 222, etc. Because QUIC is implemented based on UDP, signature probe 226 may obtain the message by listening at a particular port associated with HTTP/3 and UDP (e.g., UDP port 443).

After the signature probe 226 obtains the message, signature probe 222 may determine whether the message is a training message (block 304). A training message is a message sent from a training application. A training application is programmed to generate a QUIC CHELLO message but with one of its header fields modified to indicate that the message is for training signature manager 230. For example, in one implementation, source connection ID-related fields (e.g., a SCID length field or SCID field itself, to be described below) or destination connection ID-related fields (e.g., a DCID length field or DCID field itself, to be described below) within the message may indicate that the message is to be used for training signature manager 230.

If the message is a training message (block 304: YES), signature probe 226 may generate a training signature based on the training message and send the training signature to signature manager (block 306). A training signature is a vector similar to expression (1) but with the following additional information: a flag indicating that the signature is to be used for training, device type information, and/or application type information. Signature manager 230 may use the training signature to retrieve a corresponding classification model (e.g., a Nearest Neighbor model) associated with the training signature from signature DB 232. Signature manager 230 may then modify or retrain the model using the training signature (block 306). After the modification, signature manager 230 may store the modified model and the training signature in signature DB 232. Process 300 may then return to block 302.

At block 304, if the message is not a training message (block 304: NO), signature probe 226 may determine whether the message is a QUIC message (block 308). To determine whether the message is a QUIC message, signature probe 226 may examine the values of various fields of the header of the message, including the values of a version field and/or a header byte field. These fields are described below with reference to FIGS. 4 and 5. If signature probe 226 determines that the message is not a QUIC message (block 308: NO) based on the field values, process 300 may return to block 302. Otherwise, process 300 may proceed to block 310.

Process 300 may include signature probe 226 determining whether the message is a QUIC CHELLO message (block 310). Signature probe 226 may perform acts/tasks associated with block 310 by examining the header byte field of the QUIC message header. If the value of the header byte field indicates that the message is not a CHELLO message (block 310: NO), process 300 may return to block 302. Otherwise, process 300 may proceed to block 312.

At block 312, signature probe 226 may extract values of various header fields in the message and use the extracted values to generate a signature (block 312). Signature probe 226 may package the signature in a query or request to signature manager 230 (block 312).

When signature manager 230 receives the query sent from signature probe 226, signature manager 230 may extract the signature provided with the query. Signature manager 230 may then retrieve patterns for determining a device type or and/or an application type from signature DB 232 and may compare the signature against the retrieved patterns to find a matching pattern (block 314). If signature manager 230 is able to find a match (block 314: YES), signature manager 230 may select the device type and/or the application type associated with the matched pattern as the type of device and/or application that sent the message (block 316).

For example, as discussed above with reference to FIG. 2B, signature manager 230 may identify a pattern whose Euler distance from the signature is smaller than Euler distances from the signature to other patterns. If signature manager 230 is able to identify the pattern with the smallest Euler distance, signature manager 230 may conclude that the pattern matches the signature and designate the device type and/or the application type associated with the identified pattern as the type of device or application that sent the CHELLO message.

Process 300 may further include signature manager 230 generating a reply to the query from signature probe 226 (block 316). Signature manager 230 may indicate, in the reply, the device type and/or the application type. Signature manager 230 may send the reply to signature probe 226. In response, signature probe 226 may mark the data flow associated with the message (block 316). As noted above, the marking may entail signature probe 230 indicating, for example, the device type or application type (identified in the reply from signature manager 230) in a table or in another data structure where information about data flows is maintained. Process 300 may then return to block 302.

Returning to block 314, if signature manager 230 is not able to find a match (block 314: NO), signature manager 230 may store the signature in signature DB 232 (block 318) for later use (e.g., use to perform supervised training of the classification model). Thereafter, signature manager 230 may send a reply to the query from signature probe 226, indicating in the reply that no match was found—no device type and/or application type was found (block 318). When signature probe 230 receives the reply, signature probe 230 may mark the data flow associated with the CHELLO message as being associated with an unknown device type and/or application type (block 320). Process 300 may then return to block 302.

FIG. 4 is a diagram of an example format of a QUIC CHELLO message 400. As described above, signature probe 226 may extract vector components for constructing a signature from a CHELLO message. The extraction process may be based on the format of QUIC CHELLO message. Signature probe 226 may assemble the extracted components to generate a signature. Although a particular format for QUIC CHELLO message 400 is shown in FIG. 4, in other implementations, the CHELLO message format may be different than that depicted in FIG. 4.

As shown, CHELLO message 400 may include a header byte field 402, a version field 404, a destination connection identifier (DCID) length field 406, a DCID field 408, a source connection identifier (SCID) length field 410, a SCID field 412, a token length field 414, a token field 416, a packet number field 418, and a payload field 420. Depending on the implementation, QUIC CHELLO may include different fields than those shown in FIG. 4.

Header byte field 402 may indicate whether the message (or a packet) 400 is a hello message. Version field 404 may include information that identifies the version of QUIC. DCID length field 406 may indicate the length of DCID field 406, which immediately follows the DCID length field 406. DCID field 408 includes information that may identify the destination connection endpoint. In some implementations, the information may also identify the type of server which is to establish the connection with the source endpoint.

SCID length field 410 may indicate the length of the field SCID field 412. SCID field 412 may include information that identifies the source connection endpoint. In some implementations, the information may also identify the type of UE 202 or application that sent CHELLO message 400 to establish a session. Token length field 414 may indicate the length of the token field 416. Token field 416 may include a token. Packet number field 418 may indicate the sequence number of the packet (or CHELLO message). Payload field 420 may carry the payload.

FIG. 5 is an example table 500 of data obtained from an example QUIC CHELLO message. For example, signature probe 226 may obtain the information shown in table 500 from CHELLO message 400. Table 500 includes column of indexes 502 and a column of values 504. Depending on the implementation of signature probe 226, signature probe 226 may obtain information different than that in table 500.

In table 500, each index 502 refers to a numerical label for a piece of information obtained from a particular header field of a CHELLO message. Values 504 refer to the contents of the fields corresponding to the indexes 502. Some of the values 504 may include: 0xff00001d, which refers to a QUIC version; tr.slapclap.com, which is obtained from DCID field 408; and *SM-G986U, which is obtained from the SCID field 412; "0x01e8816092921ae8," "AESG," and "C255" pertain to security—a common certificates set, authentication encryption algorithms, and key exchange algorithms.

Figure 6:
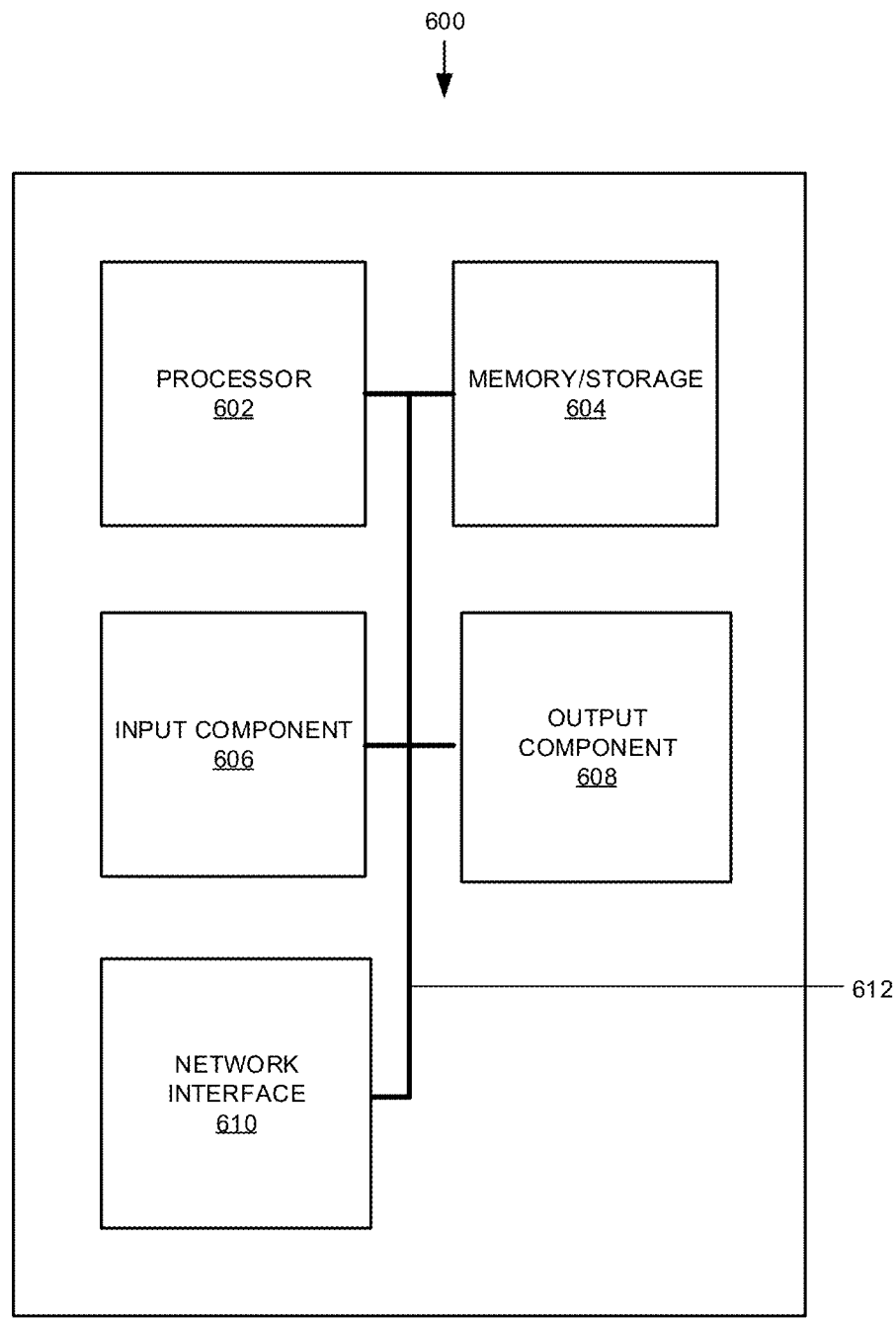
FIG. 6 shows example components of a network device, according to an implementation.

FIG. 6 depicts example components of an example network device 600. Network device 600 may correspond to or may be included in any of network components of network environment 200 or system 250 in FIGS. 2A and 2B (e.g., server 103, UE 202, wireless station 208, MEC 220, SMF 222, UPF 224, signature probe 226, signature manager 230, signature DB 232, a router, a network switch, servers, gateways, etc.). As shown, network device 600 may include a processor 602, memory/storage 604, input component 606, output component 608, network interface 610, and communication path 612. In different implementations, network device 600 may include additional, fewer, different, or a different arrangement of components than the ones illustrated in FIG. 6.

Processor 602 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), graphical processing unit (GPU), microcontrollers, and/or other processing logic (e.g., embedded devices) capable of controlling device 600 and/or executing programs/instructions.

Memory/storage 604 may include static memory, such as read only memory (ROM), and/or dynamic memory, such as random access memory (RAM), or onboard cache, for storing data and machine-readable instructions (e.g., programs, scripts, etc.). The RAM may be used to map out a virtual memory, from which receive windows may be allocated.

Memory/storage 604 may also include a floppy disk, CD ROM, CD read/write (R/W) disk, optical disk, magnetic disk, solid state disk, holographic versatile disk (HVD), digital versatile disk (DVD), and/or flash memory, as well as other types of persistent storage device (e.g., Micro-Electromechanical system (MEMS)-based storage medium) for storing data and/or machine-readable instructions (e.g., a program, script, etc.). Memory/storage 604 may be external to and/or removable from network device 600. Memory/storage 604 may include, for example, a Universal Serial Bus (USB) memory stick, a dongle, a hard disk, off-line storage, a Blu-Ray® disk (BD), etc. Memory/storage 604 may also include devices that can function both as a RAM-like component or persistent storage, such as Intel® Optane memories. The storage 604 may be used in implementing, for example, database 304.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 606 and output component 608 may provide input and output from/to a user to/from device 600. Input/output components 606 and 608 may include a display screen, a keyboard, a mouse, a speaker, a microphone, a camera, a DVD reader, USB lines, and/or other types of components for obtaining, from physical events or phenomena, to and/or from signals that pertain to device 600.

Network interface 610 may include a transceiver (e.g., a transmitter and a receiver) for network device 600 to communicate with other devices and/or systems. For example, via network interface 610, network device 600 may communicate over a network, such as the Internet, an intranet, a terrestrial wireless network (e.g., a WLAN, WIFI™, WIMAX™, etc.), a satellite-based network, optical network, etc.

Network interface 610 may include an Ethernet interface to a LAN, and/or an interface/connection for connecting device 600 to other devices (e.g., a Bluetooth interface). For example, network interface 610 may include a wireless modem for modulation and demodulation.

Communication path 612 may enable components of network device 600 to communicate with one another.

Network device 600 may perform the operations described herein in response to processor 602 executing software instructions stored in a non-transient computer-readable medium, such as memory/storage 604. The software instructions may be read into memory/storage from another computer-readable medium or from another device via network interface 610. The software instructions stored in memory/storage (e.g., memory/storage 604, when executed by processor 602, may cause processor 602 to perform processes that are described herein.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of blocks and arrows have been described above with regard to the processes illustrated in FIG. 3, the order of the blocks may be modified in other implementations. In addition, non-dependent blocks may represent actions or tasks that can be performed or exchanged in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising:
a first network device comprising a first processor configured to:
obtain a copy of a first message sent from an application on a User Equipment device (UE) to a network component different from the first network device;
construct a signature based on the copy of the first message; and
send a second message including the signature to a second network device, wherein the second message requests the second network device to provide, to the first network device, a device type of the UE or an application type of the application,
wherein when the first processor constructs the signature, the first processor is configured to:
extract values from fields of a header of the first message; and
generate the signature by assembling the values,
wherein the first message includes a QUIC Client hello message.

2. The system of claim 1, wherein the first network device includes one of:
a network router;
a Mobility Management Entity (MME);
a Packet Data Network Gateway;
a User Plane Function (UPF); or
a Session Management Function (SMF).

3. The system of claim 1, wherein the header includes at least one of:
a header byte field;
a version field;
a destination connection identifier (DCID) field; or
a source connection identifier (SCID) field.

4. The system of claim 1, further comprising:
the second network device comprising a second processor configured to:
receive the second message from the first network device;
compare the signature included in the second message to patterns to identify a matching pattern among the patterns;
if the matching pattern is identified,
obtain at least one of a device type or application type based on the matching pattern; and
send, to the first network device, a reply that indicates at least one of the device type or the application type;
if a matching pattern is not identified,
send, to the first network device, a reply that indicates no device type and no application type; and
store the signature for further analysis.

5. The system of claim 4, wherein when the second processor compares the signature, the second processor is configured to:
determine a distance from the signature to at least one of the patterns.

6. The system of claim 1, wherein the second processor is further configured to:
train a classification model based on a K-Nearest Neighbor algorithm.

7. The system of claim 1, wherein the first processor is further configured to:
receive a reply from the second network device;
if the reply indicates at least one of the device type or the application type, mark a data flow associated with the first message with at least one of the device type or the application type; and
if the reply does not indicate a device type and an application type, mark the data flow associated with the first message as having an unknown device type and an unknown application type.

8. A method comprising:
obtaining a copy of a first message sent from an application on a User Equipment device (UE) to a network component different from a first network device;
constructing a signature based on the copy of the first message; and
sending a second message including the signature to a second network device, wherein the second message requests the second network device to provide, to the first network device, a device type of the UE or an application type of the application,
wherein constructing the signature includes:
extracting values from fields of a header of the first message; and
generating the signature by assembling the values,
wherein the first message includes a QUIC Client hello message.

9. The method of claim 8, wherein the second network device includes one of:
a network router;
a Mobility Management Entity (MME);
a Packet Data Network Gateway;
a User Plane Function (UPF); or
a Session Management Function (SMF).

10. The method of claim 8, wherein the header includes at least one of:
a header byte field;
a version field;
a destination connection identifier (DCID) field; or
a source connection identifier (SCID) field.

11. The method of claim 8, further comprising:
receiving the second message from the first network device;
comparing the signature included in the second message to patterns to identify a matching pattern among the patterns;
if the matching pattern is identified,
obtaining at least one of a device type or application type based on the matching pattern; and
sending, to the first network device, a reply that indicates at least one of the device type or the application type;
if a matching pattern is not identified,
sending, to the first network device, a reply that indicates no device type and no application type; and
storing the signature.

12. The method of claim 11, wherein comparing the signature comprises:
determining a distance from the signature to at least one of the patterns.

13. The method of claim 8, further comprising:
training a classification model based on a K-Nearest Neighbor algorithm.

14. The method of claim 8, further comprising:
receiving a reply from the second network device;
if the reply indicates at least one of the device type or the application type, marking a data flow associated with the first message with at least one of the device type or the application type; and
if the reply does not indicate a device type and an application type, marking the data flow associated with the first message as having an unknown device type and an unknown application type.

15. A non-transitory computer readable medium comprising computer-executable instructions, wherein when executed by one or more processors included in a first network device, the instructions cause the one or more processors to:
obtain a copy of a first message sent from an application on a User Equipment device (UE) to a network component different from the first network device;
construct a signature based on the copy of the first message; and
send a second message including the signature to a second network device, wherein the second message requests the second network device to provide, to the first network device, a device type of the UE or an application type of the application,
wherein when constructing the signature, the one or more processors are configured to:
extract values from fields of a header of the first message; and
generate the signature by assembling the values,
wherein the first message includes a QUIC Client hello message.

16. The non-transitory computer-readable medium of claim 15, wherein the first network device includes one of:
a network router;
a Mobility Management Entity (MME);
a Packet Data Network Gateway;
a User Plane Function (UPF); or
a Session Management Function (SMF).

17. The non-transitory computer-readable medium of claim 15, wherein the header includes at least one of:
a header byte field;
a version field;
a destination connection identifier (DCID) field; or
a source connection identifier (SCID) field.

18. The non-transitory computer-readable medium of claim 15, wherein the second network device comprises a second processor configured to:
receive the second message from the first network device;
compare the signature included in the second message to patterns to identify a matching pattern among the patterns;
if the matching pattern is identified,
obtain at least one of a device type or application type based on the matching pattern; and
send, to the first network device, a reply that indicates at least one of the device type or the application type;
if a matching pattern is not identified,
send, to the first network device, a reply that indicates no device type and no application type; and
store the signature for further analysis.

19. The non-transitory computer-readable medium of claim 18, wherein when comparing the signature, the second processor is configured to:
determine a distance from the signature to at least one of the patterns.

20. The non-transitory computer-readable medium of claim 15, wherein the second processor is further configured to:
train a classification model based on a K-Nearest Neighbor algorithm.

* * * * *